Sept. 19, 1967  JAMES E. WEBB  3,342,066
ADMINISTRATOR OF THE NATIONAL AERONAUTICS
AND SPACE ADMINISTRATION
MODEL LAUNCHER FOR WIND TUNNELS
Filed April 2, 1965  2 Sheets-Sheet 1
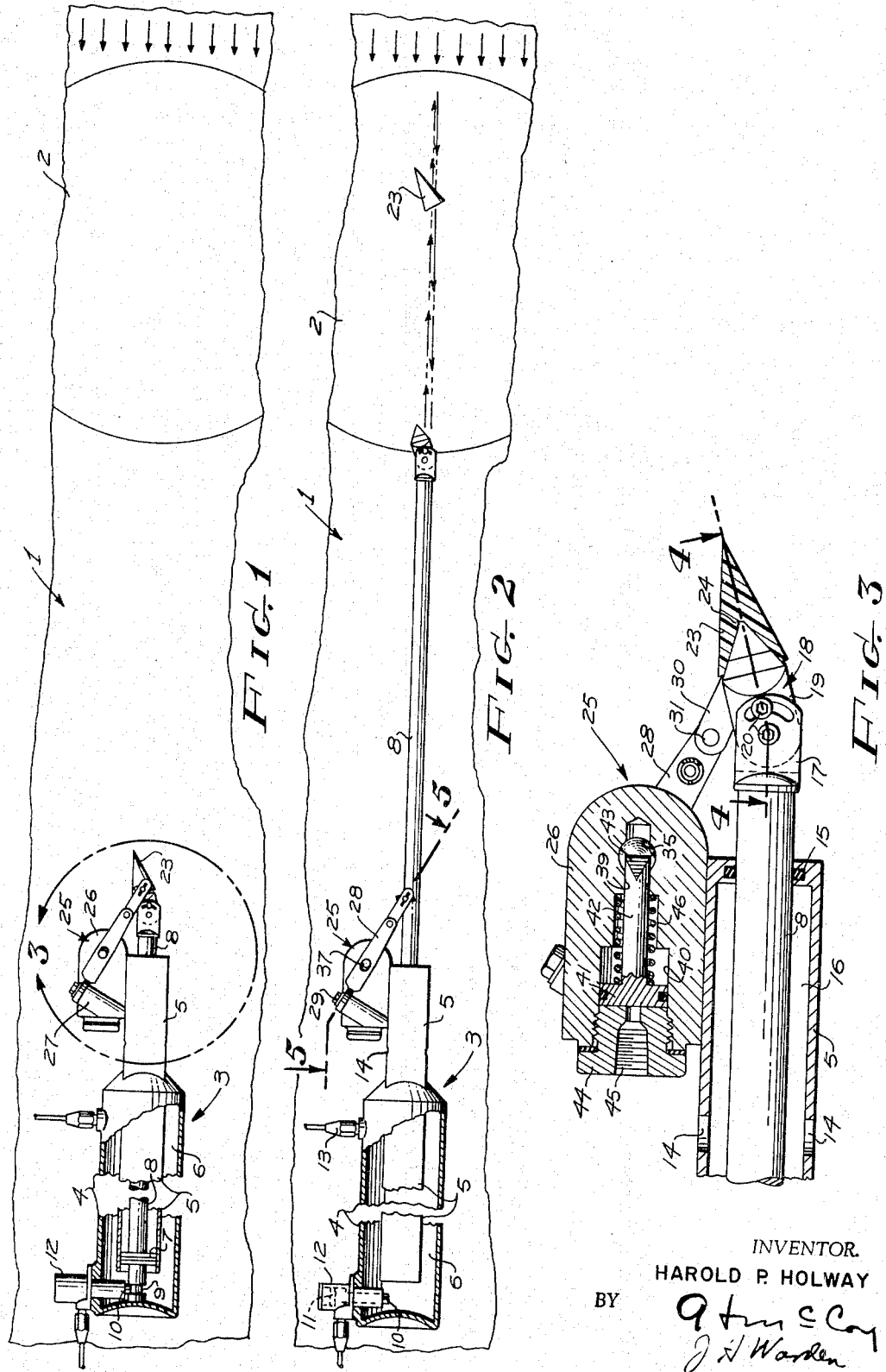
INVENTOR.
HAROLD P. HOLWAY
BY
ATTORNEYS Sept. 19, 1967  JAMES E. WEBB  3,342,066
ADMINISTRATOR OF THE NATIONAL AERONAUTICS
AND SPACE ADMINISTRATION
MODEL LAUNCHER FOR WIND TUNNELS
Filed April 2, 1965  2 Sheets-Sheet 2
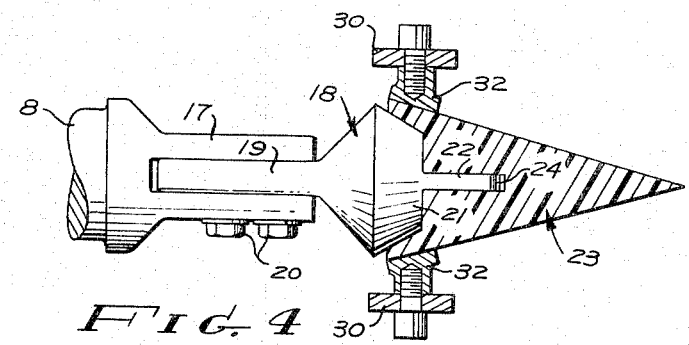
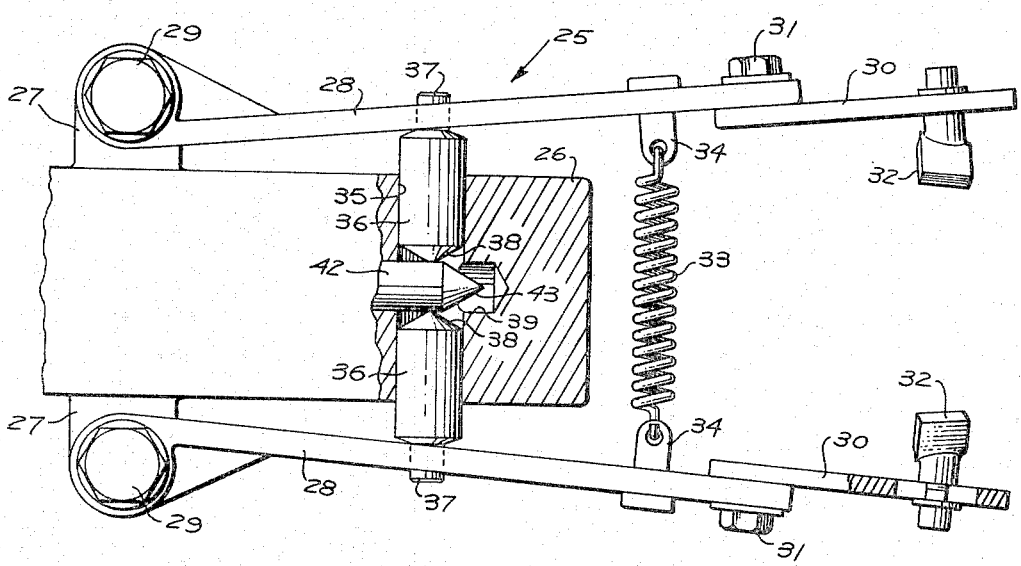
INVENTOR.
HAROLD P. HOLWAY
BY
ATTORNEYS

United States Patent Office 3,342,066
Patented Sept. 19, 1967

3,342,066
MODEL LAUNCHER FOR WIND TUNNELS
James E. Webb, Administrator of the National Aeronautics and Space Administration, with respect to an invention of Harold P. Holway, La Crescenta, Calif.
Filed Apr. 2, 1965, Ser. No. 445,292
3 Claims. (Cl. 73—147)

ABSTRACT OF THE DISCLOSURE

This invention is employed for studying the performance of a body in a high speed wind tunnel. A model launcher is positioned within the wind tunnel adjacent a viewing window. The model launcher includes a chamber and a piston movable within said chamber. The piston ends in a rod having an end whereupon the body or model can be supported for a launching. The piston is held from moving while gas under pressure is introduced into the chamber. When the piston is releaesd, the gas moves the piston and the rod until the piston is snubbed, whereupon the model can continue its movement into the wind in the chamber, and its operation in flight is studied through the window.

Origin of the invention

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to model launchers for wind tunnels, more particularly to model launchers for use in high speed wind tunnels. Included in the objects of this invention are:

First, to provide a model launcher which propels a model into free flight and which does not disturb the flow of fluid in or near the flight path of the model.

Second, to provide a model launcher which is located in a wind tunnel downstream from the observation area and which projects a model through the observation area against the flow of fluid, the model thereupon moving downstream impelled by the moving fluid so that both movements of the model may be observed or photographed for analysis.

Third, to provide a model launcher which incorporates a novel mounting tip adapted to support at different angles of attack, models of various shapes and masses while exposed to a supersonic fluid stream, and a novel holder which grasps the model to insure its retention on the mounting tip until the time of launching.

With the above and other objects in view, as may appear hereinafter, reference is directed to the accompanying drawings, in which:

FIGURE 1 is a fragmentary view of a wind tunnel showing the model launcher partially in section and partially in elevation and in its retracted position.

FIGURE 2 is a similar fragmentary sectional view showing the model launcher in its extended position.

FIGURE 3 is an enlarged sectional view of the model launcher taken through circle 3 of FIGURE 1.

FIGURE 4 is a further enlarged fragmentary sectional view taken through 4—4 of FIGURE 3.

FIGURE 5 is an enlarged fragmentary sectional view taken through 5—5 of FIGURE 2.

The model launcher is intended to be used in a high speed wind tunnel 1; that is a wind tunnel of the type in which air or other gaseous fluid is propelled at a speed above the speed of sound. Conventionally, this type of wind tunnel is provided with an observation window 2. The model launcher designated generally by 3 includes an elongated jacket 4. The jacket is suitably mounted by means not shown in a longitudinal position within the wind tunnel at a point downstream from the observation window 2. The jacket receives a chamber 5 which is preferably square in cross section.

The cylinder is provided with an open end opposed to the interior of the jacket 4 and the cylinder forms with the jacket a charging chamber 6. Slidably mounted in the chamber 5 is a piston 7 which is square in cross section to fit the chamber and is provided with a shaft 8 which extends through the piston. That portion of the shaft which extends rearwardly or downstream from the piston and beyond the chamber is provided with a latching groove 9. The groove is adapted to be engaged by a laterally extending latch pin 10 attached to a retracting piston 11 mounted within a small cylinder 12 secured to one side of the jacket 4.

The charging chamber 6 is connected to a pressurizing line 13 so that the downstream side of the piston 7 may be exposed to a charge of gas at a pretermined pressure. The forward or upstream end of the chamber 5 projects beyond the jacket 4 and is provided near its upstream end with exhaust ports 14. The extremity of the chamber 5 is provided with an end seal 15 surrounding the shaft 8. The region between the exhaust ports 14 and end seal 15 forms a snubbing chamber 16.

The forward or upstream end of the shaft 8 is flattened and slotted to form a vertically disposed clevis 17. A model mounting member 18 is provided which includes a plate 19 which fits within the clevis 17 and is adapted to be secured in various angular positions with respect to the clevis by means of screws 20. Forwardly or upstream from the plate 19 the mounting member is provided with a conical portion 21 from which portions of opposite sides are cut away so as to form a flat triangular tip portion 22. The mounting member is intended to support a wind tunnel model 23.

Internally the model is provided with a recess mating the mounting member. By reason of the flat tip portion 22, the connection between the mounting member and the clevis 17 and the square cylinder 5 and its piston 7, the model is oriented in a predetermined plane. In the drawing, the model is shown as a simple cone, however, the model may have various shapes corresponding to the shape of the space vehicle, aircraft or component thereof which is being tested.

The model is preferably formed of plastic material. To obtain the desired mass and location of the center of gravity of the model, various weighing agents are incorporated in the plastic material. In addition, steel or lead inserts such as balls may be provided.

When the model and the launcher are exposed to the flow of fluid in the tunnel, the model is forced tightly onto the mounting member. Small locking teeth 24 may be provided on the tip portion 22 to aid in holding the model in place. Inasmuch as in the course of conducting a test there may be considerable delay due to the need of adjusting the equipment which is required for the test and due to the fact that the flow of velocities may vary substantially rising from zero velocity to the test velocity, it is desirable that the model be held in place by means other than the mounting member until just before the test is to take place. In order to secure the model prior to test, there is provided a holder 25 which includes a body 26 suitably mounted on the forward or upstream end of the cylinder 5.

The body is provided with lateral bosses 27 which support lever arms 28 by means of pivots 29. The lever arms extend downwardly and forwardly toward the model and are provided with adjustable extensions 30 secured to the arms 28 by screws 31. The extremities of the extensions 30 are provided with fingers 32 which conform to opposite sides of the model and are adjustable.

The lever arms are urged towards each other by a spring 33 anchored at its extremity to opposed end pins 34 carried by the lever arms 28.

The body 26 is provided with a cross bore 35 which receives slide pins 36 having reduced ends 37 loosely fitting in openings provided in the lever arms 28. The confronting ends of the pins 36 are conical as indicated by 38.

The cross bore 35 is intersected at its midpoint by a guide bore 39 which is enlarged at its rearward or downstream end to form a cylinder 40 which receives a piston 41. The piston 41 is provided with a stem 42 which fits the guide bore 39 and is provided with a wedge tip 43 adapted to pass between the confronting conical ends 38 of the pins 36 so as to spread the pins and the lever arms 28.

The cylinder 40 is provided with a cap 44 containing a supply port 45 connected to a fluid supply line for the purpose of thrusting the piston 41 and stem 42 forwardly. A return spring 46 retracts the stem when the fluid pressure is relieved.

Operation of the model launcher for wind tunnels is as follows:

The launcher 3 is mounted downstream from the observation window 2 at such a distance that the shaft 8 when in its extended position, shown in FIGURE 2, reaches approximately to the downstream side of the observation window. The model 23 to be tested is placed on the mounting member 18. The mounting member is adjusted so as to dispose the model initially at a selected angle of attack.

Initially, the shaft 8 is in its retracted position and the fingers 32 of the holder 25 are positioned so as to retain the model in place.

The shaft 8 is held in its retracted position by the latch pin 10. Prior to test, the charging chamber 6 is pressurized to a predetermined pressure calculated to drive the shaft 8 and model forwardly or upstream against the high velocity fluid flowing in the wind tunnel. The velocity of the fluid may be several times the speed of sound.

Prior to release of the latch pin 10, the fingers 32 are moved laterally from the model 23. To begin the test, the latch pin 10 is retracted causing the pressure fluid to drive the shaft forward or upstream at a predetermined velocity. As the shaft 8 reaches its forward or upstream position, its forward movement is snubbed causing the model 23 to continue in an upstream direction and in free flight across the observation window 2. The force applied is calculated to cause the model to travel in free flight approximately the width of the observation window at which point the force is expended whereupon the high velocity fluid drives the model backward with respect to the observation window as represented by the broken lines in FIGURE 2.

As a result, each test involves not only one but two traverses of the observation window so as to provide a test of maximum duration. Furthermore, inasmuch as the entire launch is downstream from the observation window and the model is in free flight, any disturbance in the flow of fluid is created by the model itself.

It should be noted that the models employed are expendable and are destroyed or damaged on impact against the launcher itself or other surfaces downstream from the observation window.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. A model launcher for use in a wind tunnel, having an observation window, said launcher comprising:
    (a) a model supporting member disposed downstream from said observation window and including a model receiving tip at its upstream side for retaining said model thereon when said model is subjected to the force of fluid flowing downstream past said model, said tip permitting upstream movement of said model away from said tip;
    (b) a shaft connected to said supporting member and extending downstream therefrom;
    (c) a piston and chamber for said shaft;
    (d) means for imparting a predetermined force to said piston thereby to drive said shaft, supporting member and model upstream; means for sunbbing said shaft at the end of a predetermined amount of motion upstream;
    (e) and means mounted on said cylinder for clamping said model in place on said supporting member prior to movement of said shaft.

2. A model launcher for use in a wind tunnel, having an observation window, said launcher comprising:
    (a) a model supporting member disposed downstream from said observation window and including a model receiving tip at its upstream side for retaining said model thereon when said model is subjected to the force of fluid flowing downstream past said model, said tip permitting upstream movement of said model away from said tip;
    (b) a shaft connected to said supporting member and extending downstream therefrom;
    (c) a piston and chamber for said shaft;
    (d) means for imparting a predetermined force to said piston thereby to drive said shaft, supporting member and model upstream; means for snubbing said shaft at the end of a predetermined amount of motion upstream;
    (e) a pair of opposed clamping arms mounted on said cylinder for engagement with a model in place on said supporting member;
    (f) and means for spreading said clamping arms.

3. A model launcher for use in a wind tunnel, having an observation window, said launcher comprising:
    (a) a model supporting member disposed downstream from said observation window and including a model receiving tip at its upstream side for retaining said model thereon when said model is subjected to the force of fluid flowing downstream past said model, said tip permitting upstream movement of said model away from said tip;
    (b) a shaft connected to said supporting member and extending downstream therefrom;
    (c) a piston and chamber for said shaft;
    (d) means, including said piston, defining a charging chamber adapted to receive gas at a preselected pressure;
    (e) latch means restraining said piston and shaft in a retracted downstream position with respect to said cylinder;
    (f) means for releasing said latch means thereby to impart a predetermined thrust to said model in an upstream direction;

(g) means for arresting said piston and cylinder to cause said model to continue upstream in free flight past said observation window;
(h) a pair of opposed clamping arms mounted on said cylinder for engagement with a model in place on said supporting member;
(i) and means for spreading said clamping arms.

References Cited

UNITED STATES PATENTS

| | | | |
|---|---|---|---|
| 2,499,379 | 3/1950 | Garrett | 89—1 X |
| 2,780,213 | 2/1957 | Colling et al. | 124—11 |
| 2,799,460 | 7/1957 | Hastings | 73—147 X |

DAVID SCHONBERG, *Primary Examiner.*